United States Patent Office 3,329,062
Patented July 4, 1967

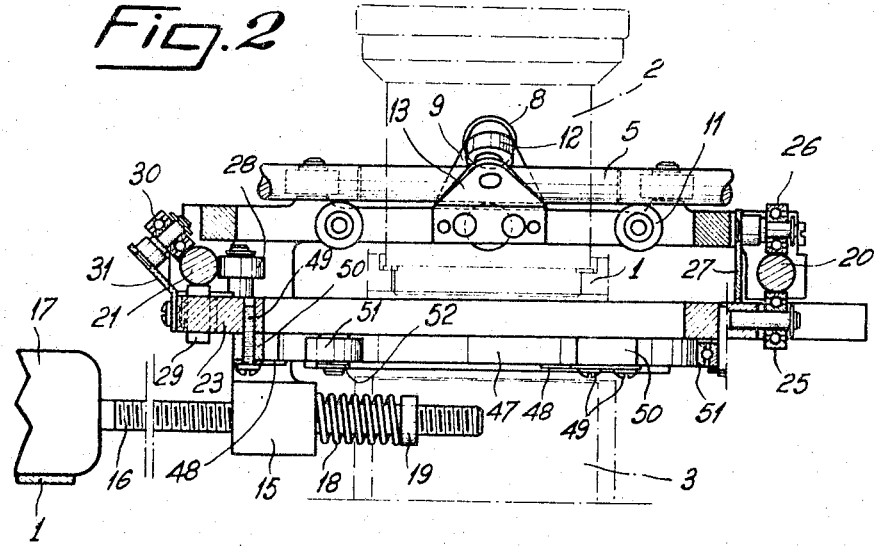
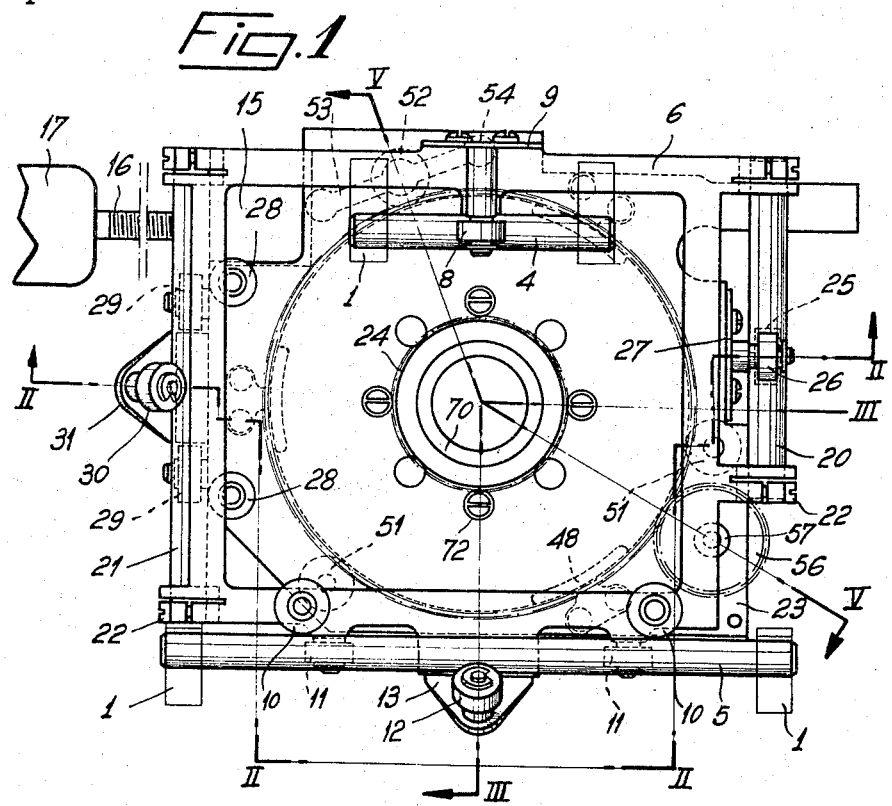

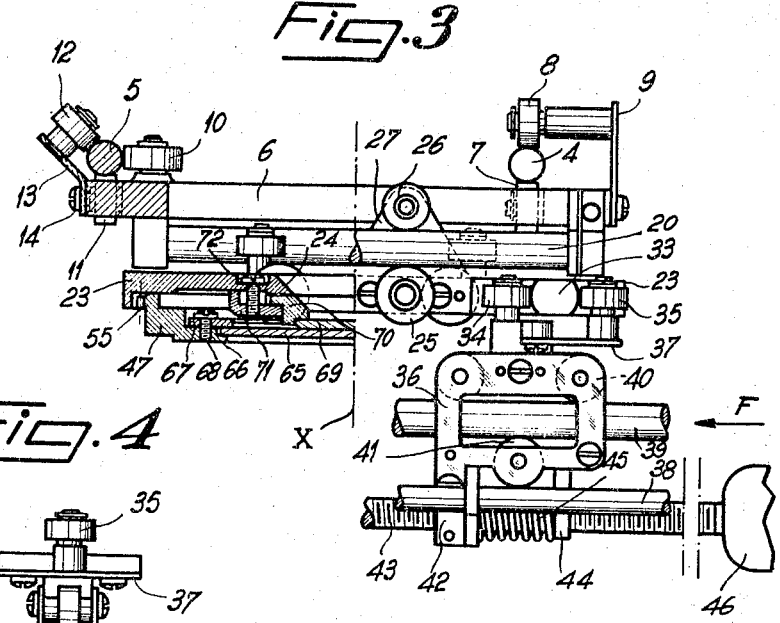
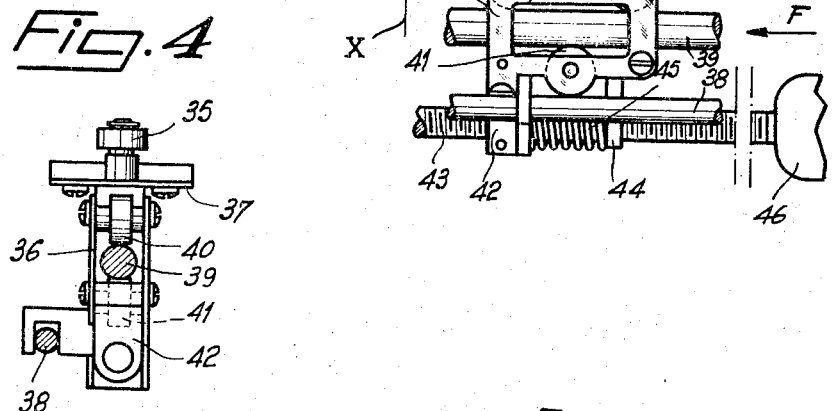
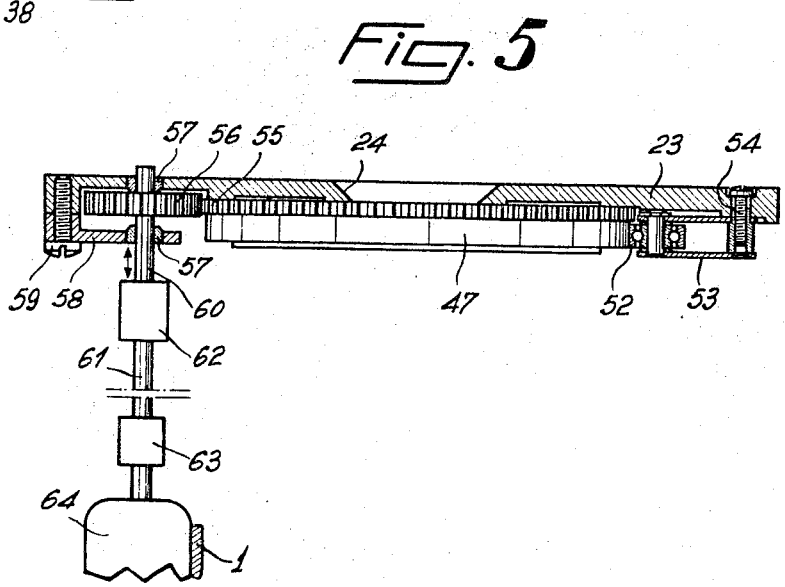

3,329,062
ILLUMINATED INFORMATION TABLE
Jean Pierrat, Versailles, Yvelines, France, assignor to Societe Anonyme des Ateliers d'Aviation Louis Breguet, Paris, France, a corporation of France
Filed Dec. 17, 1965, Ser. No. 514,472
Claims priority, application France, Dec. 22, 1964, 996,617
16 Claims. (Cl. 88—24)

French patent specification No. 1,253,224 of November 24, 1958 describes an illuminated information table providing an automatic and simultaneous display of a number of data items which are either fixed or are variable in time, by projection on a screen of images corresponding to the various data elements to be displayed. In one embodiment, a projection system is associated with each data element and can project the corresponding image on any part of the screen, the projected image being moved by the lens being moved relatively to a stationary image support or by the image support being moved relatively to a stationary lens.

The present invention relates to an improved mechanism for producing the relative movements between the image support and the lens, such movement being in translation along two rectangular coordinates axes and, where applicable, rotation around a third axis perpendicular to the first-mentioned two axes, the movements being provided by motors which are rigidly connected to the frame of the projection system, the amount of space which is taken up being very reduced and, more particularly, sufficient space being left for a large condenser.

According to this invention, the mechanism for moving the moving element—preferably the image support, the lens staying stationary—of a projection system comprises: a first carriage slidable on stationary guides parallel to a first coordinates axis; a second carriage which is disposed on the first carriage and can slide relatively thereto parallel to a second coordinates axis and bearing the moving element; and an auxiliary carriage slidable relatively to the second carriage parallel to the first coordinates axis and also slidable on stationary guides parallel to the second coordinates axis, so that the position of the moving element can be adjusted by the first carriage and auxiliary carriage being moved on their respective stationary guides by means of two motors which are themselves stationary.

When it is required for the image support also to rotate around an axis parallel to the lens axis, such rotation can be produced by another stationary motor connected to a plate for the image support by a transmission which includes two constant velocity ratio joints. If the image includes rotatable and non-rotatable elements, separate and appropriately mounted image supports are used.

The invention is illustrated by way of example in the accompanying drawings, in which:

FIG. 1 is a plan view of a mechanism according to the invention, the auxiliary carriage being omitted from the drawing in order not to overload the same;

FIG. 2 is a view in front elevation, with partial sectioning, along the line II—II of FIG. 1;

FIG. 3 is a view in side elevation, and in half-section along the line III—III of FIG. 1, and also showing the auxiliary carriage and the guiding mechanism therefor;

FIG. 4 is a partial view of the intermediate (sic!) carriage, the view being in the direction indicated by an arrow F in FIG. 3, and FIG. 5 is a partial section on the line V—V of FIG. 1 and showing the bottom carriage and the drive for the rotating plate.

In the embodiment illustrated, a stationary frame 1 bears a projection lens 2 and associated condenser 3 (shown in chain-dotted lines in FIG. 2). Rails 4, 5 are secured to the frame 1, extend, for instance, from east to west (FIG. 1) and have slidably mounted on them a carriage 6 substantially in the form of a frame. The carriage 6 is guided on the rail 4 by centrally mounted rollers 7, 8 disposed opposite one another one on each side of the rail 4. The roller 7 is rigidly mounted on the carriage, but the spindle of the roller 8 is borne by a resilient lug or bracket or the like 9 which urges the roller 8 towards the rail to take up any wear (FIG. 3). The carriage 6 is guided on the rail 5 by five rollers. Near the ends of the corresponding side of the carriage are rollers 10, 11, whose spindles are rigidly connected to the carriage and are perpendicular to one another, while near the centre of the same side a central roller 12 extends substantially in the plane bisecting the planes of the rollers 10 and 11, the spindle of the roller 12 being borne by a resilient lug or bracket or the like 13 which helps to take up wear and which is secured to the carriage 6 by screws 14 (FIGS. 1 and 3).

As can be gathered more particularly from FIG. 2, the carriage 6 has a bottom projection 15 which is formed with a tapped bore parallel to the rails 4, 5 and engaged by a screw-threaded rod 16 rotatable to either hand by a motor and reducer unit 17 mounted on the frame. A spring 18 threaded on the screwthread 16 and compressed between a ring 19 and the projection or nut 15 takes up backlash between the screw and the nut.

The mechanism just described serves to shift the carriage 6 in the east-west direction relatively to the lens 2.

Perpendicularly to the rails 4 and 5 the carriage 6 has rails 20, 21 which are clamped in screw collars 22 and on which a second carriage 23 pierced with a wide central aperture 24 can move. The carriage 23 is mounted on its rails in the same way as the carriage 6—i.e., on the rail 20 by two rollers 25, 26, the roller 26 being mounted in a wear take-up lug or the like 27, and on the rail 21 by five rollers 28, 29, 30, of which the central roller 30 is mounted on a resilient wear take-up lug or the like 31 (FIGS. 1 and 2). As FIG. 3 shows, the carriage 23 has, extending along one of its edges and below it, a rail 33 which is parallel to the rails 4, 5 and therefore perpendicular to the rails 20, 21. A pair of rollers 34, 35 of an auxiliary carriage 36 engage with the rail 33. The spindle of the roller 34 is secured to the carriage 36 and the spindle of the roller 35 is mounted in a resilient wear take-up lug or the like 37. The auxiliary carriage 36 can slide lengthwise on a rod 38 secured to the frame 1 perpendicular to the rails 4, 5 and 33 and parallel to the rails 20, 21. The carriage 36 also runs on a rail 39 which extends parallel to the rod 38 and is also secured to the frame 1, with the interposition of rollers 40, 41 provided on either side of the rail 39 (FIGS. 3 and 4). The auxiliary carriage 36 has a bottom projection 42 which forms a nut and which is engaged, in a direction parallel to the rail 39 and rod 38, by a screwthreaded rod 43 having a collar 44 and a wear take-up spring 45. A motor and reducer 46 on the frame 1 can rotate the rod 43 to either hand. This mechanism serves to move the carriage 23 on the rails 20, 21, thus composing the movement of the carriage 23 (north-south) with the east-west movement of the carriage 6.

A turntable 47 is disposed below the carriage 23 and is retained in position by three resilient support feet 48 secured by screws 49 and cross-members 50 (FIG. 2) to the carriage 23. Rollers 51, 52 disposed below the carriage 23 guide the turntable 47 in its rotation. There are three of the latter rollers disposed at an approximately 120° spacing around the turntable. The roller 52 (FIG.

5) is mounted on the carriage 23 by means of resilient strips 53 secured by means of screws 54 and serving to take up wear (see also FIG. 1). The turntable 47 is rigidly connected to an outer toothed ring 55 engaged by a pinion 56 whose teeth are wide enough for the pinion 56 to slide yet stay in mesh with the teeth 55; the pinion 56 is mounted in bearings 57 disposed the one on the carriage 23 and the other in a projection 58 secured to the carriage by screws 59 (FIG. 5). The spindle 60 of the pinion 56 is connected via a transmission 61 comprising two constant velocity ratio joints 62, 63, to a motor and reducer 64 mounted on the frame 1 (FIG. 5). This mechanism serves to compose, with the translational north-south and east-west movements of the carriages 23 and 6, the rotation of the turntable around an axis which is parallel to the axis of the lens 2 and perpendicular to the carriage-guiding rails.

A support 65 for the image to be projected is normally secured to the turntable 47, as can be seen in FIG. 3, by resting on a bottom foil or sheet or the like 66 and with maintenance by a clamping ring 67 maintained in position by screws 68. The image is appropriately centred on the turntable axis of rotation X, such axis coinciding with the axis of the aperture 24 in the carriage 23.

In the case of the projector which is required to form on the table screen the image of the aircraft silhouette surrounded by a rose of peaks whose orientation stays fixed, the silhouette is borne by a plate 65 as just described and the rose of peaks is borne by a plate 69 disposed in a ring 70 secured below the carriage 23 on the axis of the aperture 24 by right-angled lugs 71 retained by screws 72, the rose being thus permanently orientated relatively to the north-south and east-west axes.

The two images are disposed very near to one another but without touching one another, so that a single clear image can be formed on the projection screen.

I claim:

1. Mechanism for moving the moving element of a projection system for an illuminated information table providing an automatic and simultaneous display of a number of data items, by projection on a screen of images corresponding to the various data elements to be displayed, comprising a first carriage slidable on stationary guides parallel to a first co-ordinates axis; a second carriage which is disposed on the first carriage and can slide relatively thereto parallel to a second co-ordinates axis and bearing the moving element; and an auxiliary carriage slidable relatively to the second carriage parallel to the first co-ordinates axis and also slidable on stationary guides parallel to the second co-ordinates axis, means being provided for moving the first carriage and the auxiliary carriage on their respective guides.

2. Mechanism as set forth in claim 1, wherein the first carriage takes the form of a frame and slides on rollers running on two stationary rails which extend parallel to the first co-ordinates axis.

3. Mechanism as set forth in claim 1, wherein the second carriage is borne by rollers on rails which are disposed on the first carriage and which extend parallel to the second co-ordinates axis.

4. Mechanism as set forth in claim 1, wherein the auxiliary carriage is borne by rollers on a rail which is disposed on the second carriage and which extends parallel to the first co-ordinates axis.

5. Mechanism as set forth in claim 1, wherein the first carriage takes the form of a frame and slides on rollers running on two stationary rails which extend parallel to the first co-ordinates axis, the carriage-guiding rollers comprising for each rail at least one fixed-axis roller and at least one roller urged resiliently towards the rails for wear take-up.

6. Mechanism as set forth in claim 1, wherein the auxiliary carriage is mounted on rollers running on a rail parallel to the second co-ordinates axis and is also slidable on a guide rod parallel to the last-mentioned axis.

7. Mechanism as set forth in claim 1, wherein the first carriage is moved by a motor secured to the frame of the projection system.

8. Mechanism as set forth in claim 1, wherein the auxiliary carriage is moved by a motor secured to the frame of the projection system.

9. Mechanism as set forth in claim 1, wherein the first carriage is moved by a motor secured to the frame of the projection system, and the auxiliary carriage is moved by a motor secured to the frame of the projection system, the motors being connected to the respective carriages by worm transmissions with resilient wear take-up provision.

10. Mechanism as set forth in claim 1, wherein the moving element is a support for an image to be projected.

11. Mechanism as set forth in claim 1, wherein the moving element is a support for an image to be projected, said element being fixedly disposed on the second carriage.

12. Mechanism as set forth in claim 1, wherein the moving element is a support for an image to be projected, said element being disposed on the second carriage with the interposition of a turntable rotatable around an axis perpendicular to the two co-ordinates axes.

13. Mechanism as set forth in claim 1, wherein the moving element is a support for an image to be projected, said element being disposed on the second carriage with the interposition of a turntable rotatable around an axis perpendicular to the two co-ordinates axes, said plate being rotatable on rollers disposed on the second carriage, one of the latter rollers being resiliently mounted for wear take-up.

14. Mechanism as set forth in claim 1, wherein the moving element is a support for an image to be projected, said element being disposed on the second carriage with the interposition of a turntable rotatable around an axis perpendicular to the two co-ordinates axes, said plate being applied resiliently to the second carriage.

15. Mechanism as set forth in claim 1, wherein the moving element is a support for an image to be projected, said element being disposed on the second carriage with the interposition of a turntable rotatable around an axis perpendicular to the two co-ordinates axes, said plate being rotated by a motor secured to the frame of the projection system and via a transmission comprising two constant velocity ratio joints.

16. Mechanism as set forth in claim 1, wherein the moving element is a support for an image to be projected, said element being disposed on the second carriage with the interposition of a turntable rotatable around an axis perpendicular to the two co-ordinates axes, said plate being rotated by a motor secured to the frame of the projection system and via a transmission comprising two constant velocity ratio joints, and wherein the plate has peripheral teeth meshing with a pinion which is slidable on the second carriage and connected to the transmission.

References Cited

UNITED STATES PATENTS

| | | | |
|---|---|---|---|
| 543,492 | 7/1895 | Laughlin et al. | 88—24 |
| 1,552,817 | 9/1925 | Boedicker | 88—24 |
| 3,022,706 | 9/1962 | Kargl | 88—24 |

NORTON ANSHER, Primary Examiner.

WYNDHAM M. FRYE, Assistant Examiner.

UNITED STATES PATENT OFFICE
CERTIFICATE OF CORRECTION

Patent No. 3,329,062                                    July 4, 1967

Jean Pierrat

It is hereby certified that error appears in the above numbered patent requiring correction and that the said Letters Patent should read as corrected below.

In the heading to the printed specification, line 8, for "996,617" read -- 999,617 --.

Signed and sealed this 29th day of October 1968.

(SEAL)
Attest:

Edward M. Fletcher, Jr.
Attesting Officer

EDWARD J. BRENNER
Commissioner of Patents